US012258497B2

(12) United States Patent
Sakata et al.

(10) Patent No.: US 12,258,497 B2
(45) Date of Patent: Mar. 25, 2025

(54) MOISTURE-CURABLE ADHESIVE COMPOSITION

(71) Applicant: TOYOBO MC Corporation, Osaka (JP)

(72) Inventors: Hideyuki Sakata, Hyogo (JP); Kenji Kashihara, Hyogo (JP)

(73) Assignee: TOYOBO MC CORPORATION, Osaka (JP)

( * ) Notice: Subject to any disclaimer, the term of this patent is extended or adjusted under 35 U.S.C. 154(b) by 246 days.

(21) Appl. No.: 17/788,441

(22) PCT Filed: Dec. 24, 2020

(86) PCT No.: PCT/JP2020/048595
§ 371 (c)(1),
(2) Date: Jun. 23, 2022

(87) PCT Pub. No.: WO2021/132523
PCT Pub. Date: Jul. 1, 2021

(65) Prior Publication Data
US 2023/0090721 A1 Mar. 23, 2023

(30) Foreign Application Priority Data
Dec. 27, 2019 (JP) .................................. 2019-238878

(51) Int. Cl.
| | |
|---|---|
| *B32B 41/00* | (2006.01) |
| *C09J 7/10* | (2018.01) |
| *C09J 11/06* | (2006.01) |
| *C09J 123/08* | (2006.01) |
| *C09J 133/10* | (2006.01) |
| *C09J 183/12* | (2006.01) |

(52) U.S. Cl.
CPC ............ *C09J 183/12* (2013.01); *C09J 7/10* (2018.01); *C09J 11/06* (2013.01); *C09J 123/0892* (2013.01); *C09J 133/10* (2013.01); *C09J 2301/414* (2020.08); *C09J 2423/006* (2013.01)

(58) Field of Classification Search
CPC ... C09J 183/12; C09J 7/10; C09J 11/06; C09J 123/0892; C09J 133/10; C09J 2301/414; C09J 2423/006; C09J 4/06; C09J 151/06; C09J 171/02; C09J 201/10; C09J 133/04; C09J 171/00; C08F 255/02; C08F 220/325; C08F 222/06; C08L 23/26
USPC .................. 156/60, 64, 350, 351, 378, 379
See application file for complete search history.

(56) References Cited

U.S. PATENT DOCUMENTS

| | | |
|---|---|---|
| 6,426,388 B1 | 7/2002 | Fujino et al. |
| 2005/0165169 A1 | 7/2005 | Levey et al. |
| 2007/0282080 A1 | 12/2007 | Kawakami et al. |
| 2009/0081470 A1 | 3/2009 | Jucker et al. |
| 2021/0087438 A1* | 3/2021 | Sugiki ..................... C08L 51/06 |

FOREIGN PATENT DOCUMENTS

| | | |
|---|---|---|
| CN | 101268149 | 9/2008 |
| CN | 101405316 | 4/2009 |
| JP | 2001-139642 | 5/2001 |
| JP | 2002-285018 | 10/2002 |
| JP | 2004-323660 | 11/2004 |
| JP | 2005-187793 | 7/2005 |
| JP | 2005-350514 | 12/2005 |
| JP | 2009-197053 | 9/2009 |
| JP | 2011-178906 | 9/2011 |
| JP | 2012-56976 | 3/2012 |
| JP | 2012-197388 | 10/2012 |
| JP | 2013060589 A * | 4/2013 |
| JP | 2013-91754 | 5/2013 |
| JP | 2013-234235 | 11/2013 |
| JP | 2016-94566 | 5/2016 |
| JP | 5922985 | 5/2016 |
| JP | 2016-113551 | 6/2016 |
| JP | 2016-160362 | 9/2016 |
| JP | 2017-101141 | 6/2017 |
| JP | 2018-44073 | 3/2018 |
| JP | 2019-147925 | 9/2019 |
| WO | 2007/035255 | 3/2007 |
| WO | 2007/142067 | 12/2007 |
| WO | 2010/128602 | 11/2010 |
| WO | 2012/053478 | 4/2012 |
| WO | 2015/056478 | 4/2015 |
| WO | 2016/182655 | 11/2016 |
| WO | 2019/142716 | 7/2019 |

OTHER PUBLICATIONS

Extended European Search Report issued Nov. 28, 2023 in corresponding European Patent Application No. 20905875.9.
International Search Report issued Mar. 23, 2021 in International (PCT) Application No. PCT/JP2020/048595.
Japanese Office Action issued Dec. 3, 2024 in corresponding Japanese Patent Application No. 2021-567647, together with English translation thereof.

* cited by examiner

*Primary Examiner* — Michael N Orlando
*Assistant Examiner* — Joshel Rivera
(74) *Attorney, Agent, or Firm* — Wenderoth, Lind & Ponack, L.L.P.

(57) ABSTRACT

An object of this invention is to provide an adhesive composition that comprises a moisture-curable resin and a modified polyolefin and that achieves an excellent liquid state and excellent adhesion to polyolefin resin substrates. Provided is a moisture-curable adhesive resin composition comprising a moisture-curable resin (A) and a modified polyolefin resin (B), wherein the content of the modified polyolefin resin (B) is 2 parts by mass or more per 100 parts by mass of the moisture-curable resin (A).

10 Claims, No Drawings

MOISTURE-CURABLE ADHESIVE COMPOSITION

TECHNICAL FIELD

The present invention relates to a moisture-curable adhesive composition exhibiting excellent adhesion to polyolefin substrates.

BACKGROUND ART

Curable adhesives, such as room-temperature-curable adhesives and heat-curable adhesives, have been conventionally used as an adhesive for adhesion between adherends. In recent years, organic polymers containing reactive silyl groups are becoming to be actively used as moisture-curable adhesives since they exhibit properties of undergoing crosslinking by siloxane bonds formed in the hydrolysis reaction etc. of the silyl groups that occurs due to the moisture in the air at room temperature. However, strong adhesion has not yet been achieved to polyolefin substrates, such as polyolefin plates, polyolefin sheets, and polyolefin films, and a further development has been demanded.

Under the above circumstances, several moisture-curable adhesive compositions having improved adhesion to polyolefin substrates have been proposed. Examples include a composition obtained by mixing a hydrolyzable-silyl-group-containing polyether resin and a hydrolyzable-silyl-group-containing vinyl resin with a curing catalyst, a styrene-based tackifier, a reactive diluent, and a chlorinated polyolefin resin (see Patent Literature (PTL) 1).

CITATION LIST

Patent Literature

PTL JP5922985B

SUMMARY OF INVENTION

Technical Problem

However, after analysis, the present inventors found that the moisture-curable adhesive proposed as above has insufficient adhesion to polyolefin substrates since compatibility and solubility between the hydrolyzable-silyl-group-containing resins and the chlorinated polyolefin are poor, making it impossible to increase the amount of the chlorinated polyolefin resin. Even if adhesion to polyolefin substrates is greatly improved, obtaining a moisture-curable adhesive composition in a liquid state that allows for substantial use as an adhesive is extremely difficult in view of, for example, gelation and an increase in the viscosity of the adhesive within a short period of time.

The present invention has been made in consideration of the above conventional problems. Specifically, the inventors conducted extensive research on moisture-curable adhesives with excellent adhesion to polyolefin resin substrates, and consequently found that an adhesive composition comprising high proportions of a moisture-curable resin and a modified polyolefin resin achieves both a liquid state and adhesion to polyolefin substrates and dissimilar substrates. The invention has thus been completed.

More specifically, an object of the present invention is to provide a moisture-curable adhesive composition that achieves both a liquid state that allows for substantial use as an adhesive and adhesion to polyolefin substrates and dissimilar substrates.

Solution to Problem

To achieve the above objects, the following invention has been made.

A moisture-curable adhesive resin composition comprising a moisture-curable resin (A) and a modified polyolefin resin (B), wherein the content of the modified polyolefin resin (B) is 2 parts by mass or more per 100 parts by mass of the moisture-curable resin (A).

The moisture-curable adhesive composition, wherein the moisture-curable resin (A) is a resin containing a hydrolyzable silyl group at an end and having a main chain comprising a polyether or (meth)acrylate.

The moisture-curable adhesive composition, wherein the modified polyolefin resin (B) is a resin onto which a polyether resin or (meth)acrylate polymer is grafted through an amide bond and/or ester bond, and the main chain of the modified polyolefin resin (B) is a polyolefin resin.

In the adhesive resin composition, it is preferred that the grafted amount of the polyether resin and the (meth)acrylate polymer in the modified polyolefin resin (B) is 2 to 40 mass %.

In the adhesive resin composition, it is preferred that the modified polyolefin resin (B) has a molecular weight of 10,000 to 150,000.

In a more preferred embodiment, the moisture-curable adhesive resin composition further comprises a radical polymerizable monomer (C) containing a (meth)acryloyl group at an end, and additionally further comprises a radical polymerization initiator (D) and a silanol condensation catalyst (E).

Advantageous Effects of Invention

When used as an adhesive, the moisture-curable composition of the present invention is capable of achieving both sufficient adhesion to polyolefin substrates and a liquid state that allows for practical use as an adhesive.

DESCRIPTION OF EMBODIMENTS

Embodiments of the present invention are described in detail below.

Moisture-Curable Resin (A)

The moisture-curable resin (A) for use in the present invention is a resin exhibiting properties of undergoing crosslinking by siloxane bonds formed in a hydrolysis reaction etc. of silyl groups that occur due to the moisture in the air at room temperature. Examples of the moisture-curable resin (A) include, but are not limited to, hydrolyzable-silyl-group-containing resins. Resins containing a hydrolyzable silyl group and having an olefin component content of 50 mass % or less can be suitably used. More specific examples include hydrolyzable-silyl-group-containing polyether resins and hydrolyzable-silyl-group-containing (meth)acrylate (co)polymers. These may be used alone or in a combination of two or more.

Examples of the hydrolyzable-silyl-group-containing resins include vinyl polymers and polyether resins containing one or more hydrolyzable silyl groups. Examples of vinyl polymers and polyether resins include ethylene polymers, propylene polymers, isobutylene polymers, acrylate polymers, methacrylate polymers, styrene polymers, vinyl chloride polymers, vinylidene chloride polymers, butadiene polymers, isoprene polymers, vinyl acetate polymers, vinyl alcohol polymers, vinyl butyral polymers, and vinyl ether polymers. Copolymers containing these polymers may also be used.

A hydrolyzable silyl group refers to a group that has a hydroxyl group or a hydrolyzable group bonded to a silicon atom and that can undergo crosslinking by forming a siloxane bond via a reaction accelerated by a silanol condensation catalyst. The hydrolyzable silyl group is represented by formula (1) below:

$$-SiR^1_{(3-n)}X_n \qquad (1),$$

wherein n is 1 to 3, $R^1$ is an alkyl group containing 1 to 20 carbon atoms, an aryl group, or an aralkyl group, and X is a hydrolyzable group.

Examples of the hydrolyzable group represented by X in formula (1) include a hydrogen group; a hydroxy group; halogen atoms, such as chlorine; alkoxy groups, such as methoxy, ethoxy, and propoxy; and acyloxy, amino, amide, mercapto, alkenyloxy, aminooxy, and ketoximate groups. Of these, alkoxy groups are preferred from the standpoint of handleability in view of hydrolyzability.

The hydrolyzable-silyl-group-containing polyether resin is a resin having a repeating unit represented by the formula: —$R^2$—O— (in the formula, $R^2$ is a linear or branched alkylene group containing 1 to 15 carbon atoms), and preferably having the repeating unit in the main chain. $R^2$ in the formula: —$R^2$—O— is preferably a linear or branched alkylene group containing 2 to 8 carbon atoms, and more preferably an alkylene group containing 2 to 4 carbon atoms. It is preferred that the hydrolyzable silyl group represented by the formula (1) above be present in the main chain, and it is more preferred that a hydrolyzable silyl group be present at one or more ends of the main chain. It is preferred that a polyether resin containing a functional group represented by formula (A) be present at one or more ends of the main chain.

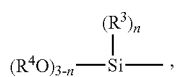

Formula (A)

wherein $R^3$ is a monovalent hydrocarbon group containing 1 to 12 carbon atoms, $R^4$ is a monovalent hydrocarbon group containing 1 to 6 carbon atoms, and n is an integer of 0 to 2.

The hydrolyzable-silyl-group-containing (meth)acrylate (co)polymer is preferably a (meth)acrylate (co)polymer having a (meth)acryloyl group repeating unit in the main chain, and containing a functional group represented by formula (A) above at one or more ends of the main chain or a side chain.

Examples of (meth)acrylate monomers for use in obtaining the hydrolyzable-silyl-group-containing (meth)acrylate (co)polymer include (meth)acrylic acid alkyl esters, such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, isooctyl (meth)acrylate, neopentyl (meth)acrylate, 2-ethylhexyl (meth)acrylate, isooctyl (meth)acrylate, isodecyl (meth)acrylate, tridecyl (meth)acrylate, stearyl (meth)acrylate, and lauryl (meth)acrylate, (meta)acrylic acid alicyclic alkyl esters, such as cyclohexyl (meth)acrylate, isobornyl (meth)acrylate, and adamantyl (meth)acrylate, hydroxy-group-containing (meth)acrylic acid esters, such as 2-hydroxyethyl (meth)acrylate, hydroxyethyl (meth)acrylate, hydroxybutyl (meth)acrylate, hydroxypropyl (meth)acrylate, ε-caprolactone addition reaction products of hydroxyethyl (meth)acrylate, phthalic acid monohydroxyethyl acrylate, and 2-hydroxy-3-phenoxypropyl acrylate, aromatic-ring-containing (meth)acrylic acid esters, such as benzyl acrylate, benzyl methacrylate, and 2-phenoxyethyl (meth)acrylate, heteroatom-containing (meth)acrylic acid esters, such as 2-methoxyethyl (meth)acrylate, dimethylaminoethyl (meth)acrylate, trifluoroethyl (meth)acrylate, tetrahydrofurfuryl (meth)acrylate, and glycidyl (meth)acrylate, and ethoxylated phenol acrylate, ethoxylated paracumyl phenol acrylate, ethoxylated nonyl phenol acrylate, propoxylated nonyl phenol acrylate, 2-ethylhexyl carbitol acrylate, ω-carboxy-polycaprolactone monoacrylate, and 2-(2-ethoxyethoxy)ethyl acrylate. These may be used alone or in a combination of two or more. In this specification, "acrylic acid" and "methacrylic acid" are referred to as "(meth)acrylic acid," and "acrylate" and "methacrylate" are referred to as "(meth)acrylate."

Among these, (meth)acrylic acid esters containing 1 to 20 carbon atoms in the ester moiety are preferably used, (meth)acrylic acid alkyl esters containing 1 to 20 carbon atoms in the ester moiety are more preferably used, and methyl (meth)acrylate, butyl (meth)acrylate, 2-ethylhexyl (meth)acrylate, 2-methoxyethyl (meth)acrylate, isodecyl (meth)acrylate, lauryl (meth)acrylate, tridecyl (meth)acrylate, stearyl (meth)acrylate, and the like are particularly preferably used.

In the present invention, the moisture-curable resin (A) may be a commercially available product. Examples include Excestar ES2410, Excestar ES2420, and Excestar ES3430, all of which are produced by AGC Inc., and MS Polymer S-202, MS Polymer S-203, MS Polymer S-303, MS Polymer S-903, MS Polymer MAX-903, MS Polymer MAX-901, MS Polymer SAX-350, MS Polymer SAT-200, MS polymer SAT-350, and MS polymer SAT-010, all of which are produced by Kaneka Corporation.

Modified Polyolefin Resin (B)

The modified polyolefin resin (B) for use in the present invention is a resin comprising, in the main skeleton, a polyolefin modified with at least one functional group, and is preferably a polyolefin resin having a structure similar to that of the main skeleton of the moisture-curable resin (A). Although not so limited, it is more preferred that at least one polyolefin, such as polyethylene, polypropylene, or a propylene-α-olefin copolymer, is modified. Examples of propylene-α-olefin copolymers include random copolymers, block copolymers, and graft copolymers. It is preferred that the modified polyolefin resin (B) has a polyether structure or a (meth)acrylate structure, and it is more preferred that a polyether compound or a (meth)acrylate compound is copolymerized. Examples of copolymerization include random copolymerization, block copolymerization, and graft copolymerization. In particular, a polyolefin resin onto which a polyether chain or (meth)acrylate chain is grafted is even more desirable.

When the modified polyolefin resin (B) is a resin onto which the same polyether resin or the same (meth)acrylate polymer as those used in the main chain of the moisture-curable resin (A) is grafted, the modified polyolefin resin (B) has improved dispersibility and compatibility with respect to the moisture-curable resin (A). Therefore, increasing the proportion of the modified polyolefin resin (B) is possible, enabling obtaining a moisture-curable adhesive composition that achieves both excellent adhesion to polyolefin substrates and excellent liquid state. "Excellent liquid state" refers to a state in which a resin composition comprising the moisture-curable resin (A) and the modified polyolefin resin (B) is not in a solid or gel state but in a liquid state, showing no separation or partial sedimentation.

The polyether chain is preferably a repeating unit represented by the formula: —$R^5$—O— (in the formula, $R^5$ is a linear or branched alkylene group containing 1 to 15 carbon atoms). $R^5$ is more preferably a linear or branched alkylene group containing 2 to 8 carbon atoms, and even more preferably a linear or branched alkylene group containing 2 to 4 carbon atoms.

The method for grafting a polyether chain in the modified polyolefin resin (B) is not limited. The method is desirably as follows. Specifically, a compound containing a functional group (1), such as an acidic group, is grafted onto a polyolefin resin by allowing a radical generator to act on the compound, and the resulting product is then further reacted with a polyether resin containing at one end a functional group (2), such as an amino or hydroxyl group reactive with the functional group (1), for grafting via a bonding mode, such as an amide or ester bond. The compound containing the functional group (1) is preferably at least one compound containing an acidic group, such as an α,β-unsaturated carboxylic acid and an acid anhydride thereof, or at least one monomer containing an epoxy group. The functional group (2) is a functional group that is reactive with the functional group (1), and is preferably an amino or hydroxyl group.

The method for grafting a (meth)acrylate chain in the modified polyolefin resin (B) is not limited. The method is desirably as follows. Specifically, a compound containing a functional group (3), such as an acidic group, is grafted onto a polyolefin resin by allowing a radical generator to act on the compound, and the resulting product is then further reacted with a (meth)acrylate polymer containing at one end a functional group (4), such as an amino or hydroxyl group reactive with the functional group (3), for grafting via a bonding mode, such as an amide or ester bond. The compound containing the functional group (3) is preferably at least one compound containing an acidic group, such as an α,β-unsaturated carboxylic acid and an acid anhydride thereof, or at least one monomer containing an epoxy group. The functional group (4) is a functional group that is reactive with the functional group (3), and is preferably an amino or hydroxyl group.

The propylene-α-olefin copolymer mainly comprises propylene that is copolymerized with an α-olefin. Examples of α-olefins include ethylene, 1-butene, 1-heptene, 1-octene, 4-methyl-1-pentene, and vinyl acetate. These may be used alone or in a combination of two or more. Among these α-olefins, ethylene and 1-butene are preferred. The ratio of the propylene component and the α-olefin component in the propylene-α-olefin copolymer is not limited. The propylene component is preferably 50 mol % or more, and more preferably 70 mole % or more.

The polypropylene random copolymers may be produced by known methods. For example, according to the production method disclosed in JP2001-206914A, a polypropylene random copolymer can be continuously produced while supplying hydrogen by placing propylene and olefins containing 2 carbon atom or 4 or more carbon atoms in a reaction vessel. The polymerization method may be carried out by continuous polymerization based on known bulk polymerization methods or gas-phase polymerization methods, and is preferably carried out based on bulk polymerization in a single or multiple steps.

Examples of the α,β-unsaturated carboxylic acids and acid anhydrides thereof include maleic acid, itaconic acid, citraconic acid, and anhydrides thereof. Among these, acid anhydrides are preferred, and maleic anhydride is more preferred.

Examples of the monomer containing an epoxy group include glycidyl (meth)acrylate, 4-hydroxybutyl acrylate glycidyl ether, and allyl glycidyl ether.

A radical generator may be used as a polymerization initiator. Examples of radical generators include peroxides, such as di-tert-butyl peroxyphthalate, tert-butyl hydroperoxide, dicumyl peroxide, benzoyl peroxide, tert-butyl peroxybenzoate, tert-butyl peroxy-2-ethylhexanoate, tert-butyl peroxypivalate, methyl ethyl ketone peroxide, di-tert-butyl peroxide, and lauroyl peroxide; and azonitriles, such as azobisisobutyronitrile and azobisisopropionitrile.

In the production of the modified polyolefin resin (B), the lower limit of the acid value of the resin onto which an α,β-unsaturated carboxylic acid or an acid anhydride thereof, or both, are grafted as the functional group (1) for use in grafting of a polyether chain or (meth)acrylate chain is preferably 5 mgKOH/g-resin or more, more preferably 7 mgKOH/g-resin or more, even more preferably 9 mgKOH/g-resin or more, still more preferably 11 mgKOH/g-resin or more, particularly preferably 13 mgKOH/g-resin or more, and most preferably 15 mgKOH/g-resin or more, from the standpoint of dispersibility and compatibility with respect to the moisture-curable resin (A), the liquid state of the resulting adhesive composition, and adhesion to polyolefin substrates. When the acid value is 5 mgKOH/g-resin or more, there are tendencies for the dispersibility and compatibility with respect to the moisture-curable resin (A) to improve, the liquid state of the resulting adhesive composition to improve, and consequently adhesion to polyolefin substrates to improve. The upper limit is preferably 50 mgKOH/g-resin or less, more preferably 48 mgKOH/g-resin or less, even more preferably 46 mgKOH/g-resin or less, still more preferably 44 mgKOH/g-resin or less, particularly preferably 42 mgKOH/g-resin or less, and most preferably 40 mgKOH/g-resin or less. When the acid value is 50 mgKOH/g-resin or less, there is a tendency for the adhesion to polyolefin substrates to be excellent. Further, production efficiency is also improved.

In the production of the modified polyolefin resin (B), the upper limit of the epoxy equivalent of the resin onto which at least one monomer containing an epoxy group is grafted as the functional group (1) for use in grafting of a polyether chain or (meth)acrylate chain is preferably 30,000 g/eq. or less, more preferably 25,000 g/eq. or less, even more preferably 20,000 g/eq. or less, still more preferably 15,000 g/eq. or less, particularly preferably 12,000 g/eq. or less, and most preferably 10,000 g/eq. or less, from the standpoint of the dispersibility and compatibility with respect to the moisture-curable resin (A), the liquid state of the resulting adhesive composition, and the adhesion to polyolefin substrates. When the epoxy equivalent is 30,000 g/eq. or less, there are tendencies for the dispersibility and compatibility with respect to the moisture-curable resin (A) to improve, and the liquid state of the resulting adhesive composition to improve, which allows for practical use as an adhesive. The lower limit is preferably 1,000 g/eq. or more, more preferably 1,100 g/eq. or more, even more preferably 1,200 g/eq. or more, still more preferably 1,300 g/eq. or more, particularly preferably 1,400 g/eq. or more, and most preferably 1,500 g/eq. or more. When the epoxy equivalent is 1,000 g/eq. or more, there is a tendency for the adhesion to polyolefin substrates to be excellent. Further, production efficiency is also improved.

The upper limit of the melting point (Tm) of the modified polyolefin resin (B) is preferably 100° C. or lower, more preferably 90° C. or lower, even more preferably 80° C. or lower, and most preferably 70° C. or lower, from the standpoint of the liquid state of the moisture-curable adhesive composition. When the melting point is 100° C. or lower, there is a tendency for the liquid state to be able to be maintained within a range that allows for substantial use as an adhesive since the viscosity of the moisture-curable adhesive composition does not significantly increase, or gelation does not easily occur as a result of disappearance of fluidity at room temperature. From the standpoint of adhesive strength against polyolefin substrates, the lower limit is preferably 30° C. or higher, more preferably 35° C. or higher, even more preferably 40° C. or higher, and most preferably 45° C. or higher. When the melting point is 30° C. or higher, the cohesive force of the modified polyolefin resin (B) tends to increase, and adhesive strength becomes excellent.

The upper limit of the weight average molecular weight (Mw) of the modified polyolefin resin (B) is preferably 150,000 or less, more preferably 130,000 or less, even more preferably 110,000 or less, and most preferably 90,000 or less, from the standpoint of the liquid state of the moisture-curable adhesive composition. When the weight average molecular weight is 150,000 or less, there is a tendency for the liquid state to be able to be maintained within a range that allows for substantial use as an adhesive since the viscosity of the moisture-curable adhesive composition does not significantly increase, or gelation does not easily occur as a result of disappearance of fluidity at room temperature. From the standpoint of adhesive strength against polyolefin substrates, the lower limit is preferably 10,000 or more, more preferably 20,000 or more, even more preferably 30,000 or more, and most preferably 40,000 or more. When the weight average molecular weight is 10,000 or more, the cohesive force of the modified polyolefin resin (B) tends to increase, and adhesive strength becomes excellent.

The upper limit of the grafted amount of a polyether resin and a (meth)acrylate polymer in the modified polyolefin resin (B) is preferably 40 mass % or less, more preferably 37 mass % or less, even more preferably 34 mass % or less, and most preferably 30 mass % or less, from the standpoint of adhesion to polyolefin substrates. When the grafted amount is 40 mass % or less, adhesion to polyolefin substrates tends to be excellent. Further, the production efficiency also improves. The lower limit is preferably 2 mass % or more, more preferably 5 mass % or more, even more preferably 8 mass % or more, and most preferably 10 mass % or more, from the standpoint of dispersibility and compatibility with respect to the moisture-curable resin (A), and the liquid state of the resulting adhesive composition. When the grafted amount is 2 mass % or more, there are tendencies for the dispersibility and compatibility with respect to the moisture-curable resin (A) to be excellent, the liquid state of the resulting adhesive composition to be excellent, and consequently adhesion to polyolefin substrates to improve.

The polyether resin containing an amino group as the functional group (2) at one end is not limited. The polyether resin preferably contains a primary amino group at one end. It is also preferred to have an ether bond, such as polyethylene glycol, polypropylene glycol, polybutylene glycol, and polytetramethylene glycol.

The upper limit of the number average molecular weight of the polyether resin is preferably 10,000 or less, more preferably 7,000 or less, even more preferably 5,000 or less, particularly preferably 3,500 or less, and most preferably 2,500 or less, from the standpoint of reactivity with the polyolefin containing the functional group (1), dispersibility and compatibility between the resulting modified polyolefin resin (B) and the moisture-curable resin (A), and adhesion to polyolefin substrates. When the number average molecular weight is 10,000 or less, the reactivity with the polyolefin containing the functional group (1) improves, and as a result, dispersibility and compatibility with respect to the moisture-curable resin (A) improves, making it possible to increase the proportion of the modified polyolefin resin (B), which can result in excellent adhesion to polyolefin substrates. The lower limit is preferably 500 or more, more preferably 1,000 or more, particularly preferably 1,200 or more, and most preferably 1,500 or more. A number average molecular weight of 500 or more achieves an excellent effect of improving dispersibility and compatibility by grafting. As a result, dispersibility and compatibility with respect to the moisture-curable resin (A) improve, making it possible to increase the proportion of the modified polyolefin resin (B) in the adhesive composition, which can result in excellent adhesion to polyolefin substrates.

The upper limit of the number average molecular weight of the (meth)acrylate polymer containing the functional group (2) is preferably 10,000 or less, more preferably 7,000 or less, even more preferably 5,000 or less, particularly preferably 3,500 or less, and most preferably 2,500 or less, from the standpoint of reactivity with the polyolefin containing the functional group (1), dispersibility and compatibility between the resulting modified polyolefin resin (B) and the moisture-curable resin (A), and adhesion to polyolefin substrates. If the number average molecular weight is equal to or more than the above ranges, the reactivity with the polyolefin containing the functional group (1) decreases, and as a result, dispersibility and compatibility with respect to the moisture-curable resin (A) decreases, making it impossible to increase the proportion of the modified polyolefin resin (B), which can result in decreased adhesion to polyolefin substrates. The lower limit is preferably 500 or more, even more preferably 1,000 or more, particularly preferably 1,200 or more, and most preferably 1,500 or more. A number average molecular weight equal to or less than the above ranges reduces the effect of improving dispersibility and compatibility by grafting. As a result, dispersibility and compatibility with respect to the moisture-curable resin (A) decrease, making it impossible to increase the proportion of the modified polyolefin resin (B) in the adhesive composition, which can result in decreased adhesion to polyolefin substrates.

The modified polyolefin resin (B) may be chlorinated. When the modified polyolefin resin (B) is chlorinated, compatibility with the moisture-curable resin (A) and the liquid state improve. When chlorinated, the chlorine content is typically 10 to 40 mass %.

From the standpoint of the liquid state of the adhesive composition and adhesion to polyolefin substrates, the modified polyolefin resin (B) must be contained in an amount of 2 parts by mass or more, preferably 5 parts by mass or more, more preferably 7 parts by mass or more, and most preferably 11 parts by mass or more, per 100 parts by mass of the moisture-curable resin (A). The content is preferably 100 parts by mass or less, more preferably 67 parts by mass or less, even more preferably 43 parts by mass or less, and most preferably 25 parts by mass or less. When the content of the modified polyolefin resin (B) is 100 parts by mass or less per 100 parts by mass of the moisture-curable resin (A), the liquid state of the adhesive composition tends to be excellent. When the proportion of the modified polyolefin resin (B) is 2 parts by mass or more with respect to the moisture-curable resin (A), adhesion to polyolefin substrates tends to be excellent.

Radical Polymerizable Monomer (C)

Examples of a radical polymerizable monomer (C) for use in the present invention include, but are not limited to, acrylic monomers, styrene monomers, vinyl monomers, and unsaturated polyester monomers. Among these, acrylic monomers are preferred in terms of light curability and a wide variety of material choices.

When the radical polymerizable monomer (C) is incorporated in the moisture-curable adhesive composition, and radical polymerization is performed, polymerization heat is generated, which can be used to melt the modified polyolefin resin (B). As a result, in the process of applying the adhesive composition to a polyolefin substrate, followed by curing, the adhesive composition achieves further improved wettability and adhesion to the substrate.

Examples of the acrylic monomers include methyl (meth) acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, isodecyl (meth)acrylate, lauryl (meth)acrylate, stearyl (meth)acrylate, isostearyl (meth)acrylate, tridecyl (meth)acrylate, behenyl (meth)acrylate, methoxyethyl (meth)acrylate, ethoxyethyl (meth)acrylate, propyloxyethyl (meth)acrylate, butoxyethyl (meth)acrylate, methoxydiethylene glycol (meth)acrylate, methoxytriethylene glycol (meth)acrylate, methoxytetraethylene (meth)acrylate, phenoxyethyl (meth) acrylate, phenoxydiethylene glycol (meth)acrylate, phenoxytetraethylene glycol (meth)acrylate, phenoxyhexaethylene glycol (meth)acrylate, methoxydipropylene glycol (meth)acrylate, methoxytripropylene glycol (meth)acrylate, cyclohexyl (meth)acrylate, tert-butylcyclohexyl (meth)acrylate, benzyl (meth)acrylate, phenoxyethyl (meth)acrylate, dicyclopentanyl (meth)acrylate, dicyclopentenyl (meth) acrylate, bornyl (meth)acrylate, isobornyl (meth)acrylate, 2-methyl-2-adamantyl (meth)acrylate, allyl (meth)acrylate, allyl (meth)acrylate, 2-hydroxy-3-acryloyloxypropyl methacrylate, polyethylene glycol diacrylate, propoxylated ethoxylated bisphenol A diacrylate, ethoxylated bisphenol A diacrylate, 9,9-bis[4-(2-acryloyloxyethoxy)phenyl]fluorene, propoxylated bisphenol A diacrylate, tricyclodecanedimethanol diacrylate, 1,10-decanediol diacrylate, 1,6-hexanediol diacrylate, 1,9-nonanediol diacrylate, dipropylene glycol diacrylate, tripropylene glycol diacrylate, polypropylene glycol diacrylate, and polytetramethylene glycol diacrylate. Polypropylene glycol diacrylate is preferred from the standpoint of curability and compatibility with the modified polyolefin resin (B).

In the present invention, the radical polymerizable monomer (C) is contained in an amount of preferably 5 parts by mass or more, more preferably 10 parts by mass or more, and even more preferably 20 parts by mass or more, per 100 parts by mass of the total of the moisture-curable resin (A) and the modified polyolefin resin (B). The amount is preferably 200 parts by mass or less, more preferably 100 parts by mass or less, and even more preferably 50 parts by mass or less. When the amount is within the range of 5 parts by mass or more and 200 parts by mass or less, both the liquid state and adhesion to polyolefin substrates tend to be excellent.

Radical Polymerization Initiator (D)

A radical polymerization initiator (D) for use in the present invention generates a radical and serves as an initiator of the polymerization of the radical polymerizable monomer (C). Examples include, but are not limited to, photopolymerization initiators that generate a radical upon light irradiation, thermal polymerization initiators that generate a radical upon heating, and redox initiators. Photopolymerization initiators and redox initiators, which can initiate the polymerization of the radical polymerizable monomer (C) without heating, are preferred.

Examples of photopolymerization initiators include, but are not limited to, benzoin-based, benzophenone-based, acetophenone-based, acylphosphine oxide-based, thioxanthone-based, metallocene-based, and quinone-based photopolymerization initiators. Specifically, known photopolymerization initiators are usable. Examples include benzophenone, 4-phenylbenzophenone, benzoylbenzoic acid, 2,2-diethoxyacetophenone, bis-diethylaminobenzophenone, benzyl, benzoin, benzoyl isopropyl ether, benzyl dimethyl ketal, 1-hydroxycyclohexyl phenyl ketone, thioxanthone, 1-(4-isopropylphenyl)$_2$-hydroxy-2-methylpropanone, 1-(4-(2-hydroxyethoxy)-phenyl)-2-hydroxy-2-methyl-1-propan-1-one, 2-hydroxy-2-methyl-1-phenylpropan-1-one, camphorquinone, 2,4,6-trimethylbenzoyl diphenylphosphine oxide, bis(2,4,6-trimethylbenzoyl)-phenylphosphine oxide, 2-methyl-1-(4-(methylthio) phenyl)-2-morpholinopropan-1-one, 2-benzyl dimethylamino-1-(4-morpholinophenyl)-1-butanone-1, and bis(2,6-dimethoxybenzoyl)-2,4,4-trimethyl-pentyl phosphine oxide.

The redox (oxidation-reduction) initiators can be used in a wide range of temperatures. In particular, the following initiator species that can be used at room temperature are advantageous. Preferable examples of suitable redox initiators include, but are not limited to, combinations of inorganic peroxide initiators (persulfate initiators, such as sodium persulfate, potassium persulfate, and ammonium persulfate) and inorganic reducing agents (e.g., sodium hydrogen metasulfite, sodium hydrogen sulfite);

combinations of organic peroxides and tertiary amines, such as a combination of benzoyl peroxide and dimethylaniline, a combination of cumene hydroperoxide and dimethylaniline, and a combination of cumene hydroperoxide and a condensation product of butyraldehyde and aniline;

combinations of organic peroxides and transition metals, such as a combination of cumene hydroperoxide and cobalt naphthenate, a combination of cumene hydroperoxide and copper naphthenate, a combination of t-butyl hydroperoxide and cobalt naphthenate, a combination of t-butyl hydroperoxide and copper naphthenate, and a combination of other hydroperoxides and other metal soaps; and combinations of transition metals and tertiary amines, such as a combination of copper naphthenate and a condensation product of butyraldehyde and aniline, and a combination of other metal soaps and a condensation product of butyraldehyde and aniline. Examples of other hydroperoxides mentioned above include diisopropyl hydroperoxide, di-t-butyl peroxide, dicumyl peroxide, t-butyl peroxy laurate, t-butyl peroxydecanoate, t-butyl peroxybenzoate, 1,1-bis(t-butylperoxy)-3,3,5-trimethylcyclohexane, p-methane hydroperoxide, diisopropylbenzene hydroperoxide, benzoyl peroxide, and methyl ethyl ketone peroxide. Examples of other metal soaps mentioned above include manganese naphthenate, cobalt octoate, aluminum stearate, calcium stearate, zinc stearate, magnesium stearate, potassium oleate, and magnesium palmitate. From the standpoint of curability and storage stability, combinations of organic peroxides and tertiary amines, and combinations of organic peroxides and transition metals are more preferred.

In the present invention, the radical polymerization initiator (D) is contained in an amount of preferably 0.1 parts by mass or more, more preferably 0.3 parts by mass or more, and even more preferably 0.5 parts by mass, per 100 parts by mass of the radical polymerizable monomer (C). The amount is preferably 5 parts by mass or less, more preferably 3 parts by mass or less, and even more preferably 2 parts by mass or less. When the amount is within the range of 0.1 parts by mass or more and 5 parts by mass or less, both the liquid state and adhesion to polyolefin substrates are tend to be excellent.

Silanol Condensation Catalyst (E)

A silanol condensation catalyst (E) for use in the present invention is used to cure the moisture-curable resin (A). Specifically, the silanol condensation catalyst (E) is used to obtain a cured resin by facilitating a polycondensation reaction between silanol groups formed by hydrolysis of the hydrolyzable silyl groups in the moisture-curable resin (A) by the moisture in the air.

The silanol condensation catalyst (E) for use in the present invention may be any known conventionally used silanol condensation catalyst. Specific examples include titanate esters, such as tetrabutyl titanate and tetrapropyl titanate;

tin carboxylates, such as dibutyltin dilaurate, dibutyltin maleate, dibutyltin diacetate, tin octylate, and tin naphthenate; thio tin compounds, such as dibutyltin bisisononyl 3-mercaptopropionate and dibutyltin bisisooctylthioglycolate;

a reaction product of dibutyltin oxide and phthalate ester; dibutyltin diacetylacetonate;

organic aluminum compounds, such as aluminum trisacetylacetonate, aluminum trisethylacetoacetate, and diisopropoxyaluminum ethylacetoacetate;

chelating compounds, such as zirconium tetraacetylacetonate and titanium tetraacetylacetonate;

lead octylate;

amine compounds, such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0)undecen-7 (DBU);

salts of these amine compounds with carboxylic acids, etc.; and other silanol condensation catalysts. Examples also include known silanol condensation catalysts, such as other acidic catalysts and basic catalysts. These catalysts may be used alone or in a combination of two or more.

In the present invention, the silanol condensation catalyst (E) is contained in an amount of preferably 0.1 parts by mass or more, more preferably 0.3 parts by mass or more, and even more preferably 0.5 parts by mass or more, per 100 parts by mass of the moisture-curable resin (A). The amount is preferably 5 parts by mass or less, more preferably 3 parts by mass or less, and even more preferably 2 parts by mass or less. When the amount is within the range of 0.1 parts by mass or more and 5 parts by mass or less, both the liquid state and adhesion to polyolefin substrates are tend to be excellent.

Moisture-Curable Adhesive Composition

The moisture-curable adhesive composition of the present invention is cured by condensation polymerization of silanol groups formed by hydrolysis of hydrolyzable silyl groups by the moisture in the air. Therefore, when used as a one-component composition, the composition is handled in a hermetically sealed state to avoid contact with air (the moisture in the air) during storage or transport. Then, when the seal is broken at the time of use, and the composition is applied to any portion, the composition will be brought into contact with the moisture in the air, causing a reaction to cure the composition. When the moisture-curable adhesive composition is used as a two-component composition, a composition comprising at least the moisture-curable resin (A), the modified polyolefin resin (B), the radical polymerizable monomer (C), and the radical polymerization initiator (D) is separately provided from the silanol condensation catalyst (E). When these components are mixed at the time of use, the moisture curing reaction described above proceeds to cure the mixture.

The moisture-curable composition of the present invention has excellent adhesion to polyolefin substrates and also has excellent adhesion to a wide variety of substrates, such as other metals, glass, and coated surfaces. Therefore, the composition may be used as an adhesive, a joint material, a sealing material, a waterproof material, a paint, a coating material, a lining material, a sealing material, an adhesive tape, an adhesive sheet, a pressure-sensitive adhesive, an adhesive processed product, and the like.

Other Additives

In addition to the moisture-curable resin (A), the modified polyolefin resin (B), the radical polymerizable monomer (C), the radical polymerization initiator (D), and the silanol condensation catalyst (E), the adhesive composition of the present invention may comprise various additives, such as plasticizers, organic solvents, tackifiers, adhesive-imparting agents, fillers, stabilizers, waxes, anti-aging agents, UV absorbers, light stabilizers, thixotropic agents, coloring agents, and blocking inhibitors, if necessary, to adjust the viscosity and physical properties as long as they do not impair the performance of the present invention.

The plasticizers are not particularly limited, and various types of plasticizers may be used, including hydrocarbons, such as process oils and various alkanes, as well as phthalate esters, polyalkylene glycol esters, and phosphate esters. Examples include phthalate esters, such as dioctyl phthalate, dibutyl phthalate, diheptyl phthalate, di(2-ethylhexyl)phthalate, butyl benzyl phthalate, butyl phthalyl butyl glycolate, and diisononyl phthalate;

non-aromatic dibasic acid esters, such as dioctyl adipate and dioctyl sebacate;

polyalkylene glycol esters, such as diethylene glycol dibenzoate and triethylene glycol dibenzoate;

phosphate esters, such as tricresyl phosphate and tributyl phosphate;

acrylic polymers; chlorinated paraffins; alkyl diphenyl;

partially hydrogenated terphenyls and other hydrocarbon oils;

process oils; and alkylbenzenes.

The organic solvents are not particularly limited and are preferably those that dissolve the moisture-curable resin (A) and the modified polyolefin resin (B). Examples include aromatic hydrocarbons, such as benzene, toluene, and xylene;

aliphatic hydrocarbons, such as hexane, heptane, octane, and decane;

alicyclic hydrocarbons, such as cyclohexane, cyclohexene, methylcyclohexane, and ethylcyclohexane;

halogenated hydrocarbons, such as trichloroethylene, dichloroethylene, chlorobenzene, and chloroform;

alcohol solvents, such as methanol, ethanol, isopropyl alcohol, butanol, pentanol, 1-hexanol, 2-ethylhexanol, 2-methylcyclohexanol, propanediol, phenol, and 2-heptyl alcohol; ketone solvents, such as acetone, methyl isobutyl ketone, methyl ethyl ketone, pentanone, hexanone, cyclohexanone, isophorone, and acetophenone;

cellosolves, such as methyl cellosolve and ethyl cellosolve; ester solvents, such as methyl acetate, ethyl acetate, butyl acetate, methyl propionate, ethyl propionate, and butyl formate; and ether solvents, such as ethylene glycol mono-n-butyl ether, ethylene glycol mono-iso-butyl ether, ethylene glycol mono-tert butyl ether, diethylene glycol mono-n-butyl ether, diethylene glycol mono-iso-butyl ether, triethylene glycol mono-n-butyl ether, tetraethylene glycol mono-n-butyl ether, dibenzyl ether, diphenyl ether, and butyl phenyl ether. A small amount of an organic solvent is preferably used to further reduce the viscosity of the moisture-curable adhesive composition and improve the liquid state and applicability at the time of use.

Examples of tackifiers include, but are not limited to, styrene copolymer resins, terpene resins, petroleum resins (e.g., C5 hydrocarbon resins, C9 hydrocarbon resins, C5 hydrocarbon-C9 hydrocarbon copolymer resins, and hydrogenated resins thereof), rosin ester resins and hydrogenated resins thereof, phenolic resins, modified phenolic resins (e.g., cashew oil modified phenolic resins, rosin phenolic resins, polymerized rosin, polymerized rosin esters, tall oil modified phenolic resins), terpene phenolic resins, xylene-phenolic resins, cyclopentadiene-phenolic resins, coumarone-indene resins, DCPD resins, xylene resins, and low-molecular-weight polystyrene resins. The presence of a tackifier is preferred to impart appropriate adhesion to the cured product of the moisture-curable adhesive composition of the present invention and improve adhesion to polyolefin substrates.

Examples of adhesive-imparting agents include, but are not particularly limited to, silane coupling agents. The presence of an adhesive-imparting agent is preferred to improve adhesion to polyolefin substrates and a wide variety of substrates such as metals, glass, and coated surfaces.

The silane coupling agent as an adhesive-imparting agent may be an organosilane represented by formula (B).

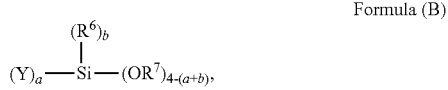

Formula (B)

wherein $R^6$ and $R^7$ are each independently a monovalent hydrocarbon group containing 1 to 4 carbon atoms, Y is a monovalent hydrocarbon group optionally containing one or more substituent groups or atoms, and a and b are each independently an integer of 0 to 2, wherein the sum of a and b is 0 to 2.

Examples of organosilanes represented by formula (B) include dimethyldimethoxysilane, methyltrimethoxysilane, tetramethoxysilane, dimethyldiethoxysilane, methyltriethoxysilane, tetraethoxysilane, diphenyldimethoxysilane, phenyltrimethoxysilane, vinyltrimethoxysilane, vinyltriethoxysilane, γ-mercaptopropyltrimethoxysilane, γ-chloropropyltrimethoxysilane, aminomethyltriethoxysilane, N-β(aminoethyl)aminomethyltrimethoxysilane, N-β(aminoethyl)methyltributoxysilane, γ-aminopropyltrimethoxysilane, γ-aminopropyltriethoxysilane, γ-aminopropylmethyldiethoxysilane, γ-aminoisobutyltrimethoxysilane, N-β(aminoethyl)γ-aminopropyltrimethoxysilane, N-β(aminoethyl)γ-aminopropylmethyldimethoxysilane, {N-β(aminoethyl)N-β(aminoethyl)}γ-aminopropyltrimethoxysilane, γ-glycidoxypropyltrimethoxysilane, γ-glycidoxypropylmethyldiethoxysilane, γ-glycidoxypropylmethyldimethoxysilane, 3,4-epoxycyclohexyl ethyltrimethoxysilane, γ-methacryloxypropyltrimethoxysilane, γ-methacryloxypropylmethyldimethoxysilane, γ-isocyanate propyltrimethoxysilane, and γ-isocyanate propylmethyldiethoxysilane. These organosilanes may be used alone or in a combination of two or more. Among these, N-β(aminoethyl)γ-aminopropyltrimethoxysilane, γ-glycidoxypropyltrimethoxysilane, vinyltrimethoxysilane, and the like are preferably selected because they are highly effective in imparting adhesion, and also because they achieve fast curing.

The proportion of the adhesive-imparting agent in the present invention is preferably 0 to 15 parts by mass and particularly preferably 1 to 10 parts by mass, per 100 parts by mass of the total of the moisture-curable resin (A) and the modified polyolefin resin (B). The adhesive-imparting agent also effectively functions as a cross-linking agent, achieving an effect of making the moisture-curable composition more susceptible to fast curing. The addition in an amount of 15 parts by mass or less greatly increases the effect of imparting adhesion and is more likely to achieve faster curing.

Examples of fillers include, but are not particularly limited to, calcium carbonate, carbon black, clay, talc, titanium dioxide, quicklime, kaolin, zeolite, diatomaceous earth, and glass balloons. These may be used alone or as a mixture. Among these, calcium carbonate and the like are preferred as a filler to easily obtain a good balance of various properties, such as the viscosity of the moisture-curable composition of the present invention and the rigidity and heat resistance of the cured product of the composition.

Substrates for Adhesion

Examples of polyolefin substrates as substrates for adhesion include conventionally known high-density polyethylene (HDPE), low-density polyethylene (LDPE), ultra-low-density polyethylene (VLDPE), linear low-density polyethylene (LLDPE), ultra-high molecular weight polyethylene (UHMW-PE), isotactic polypropylene, syndiotactic polypropylene, atactic polypropylene, block copolymers of ethylene and propylene, random copolymers (copolymers with ethylene, binary copolymers with buten-1, and ternary copolymers with ethylene-buten-1 (terpolymer)). Examples of dissimilar substrates include polyester resin, such as polyethylene terephthalate; polycarbonate resin; polyamide resin, such as nylon 6; acrylonitrile-butadiene-styrene copolymers; vinyl chloride resin; and other resin-based substrates. Examples of dissimilar substrates also include iron, stainless steel, aluminum, cold rolled steel, magnesium alloys, and other metal-based substrates. The moisture-curable adhesive composition of the present invention is used for adhesion between the polyolefin substrates or between the polyolefin substrates and the dissimilar substrates.

The present invention is described in more detail below with reference to Examples. However, the present invention is not limited to these Examples. In the Examples and Comparative Examples, the term "part" alone refers to parts by mass.

Production Example 1

One hundred parts by mass of a propylene polymer (L-Modu (registered trademark) 5600, produced by Idemitsu Kosan Co., Ltd.), 150 parts by mass of toluene, 2 parts by mass of maleic anhydride, and 10 parts by mass of di-tert-butyl peroxide were placed in a 1-L autoclave. The mixture was heated to 160° C. and then stirred for another 3 hours. Subsequently, the resulting reaction liquid was cooled and poured into a container containing a large amount of methyl ethyl ketone to deposit the resin. The resin-containing liquid was then centrifuged so that an acid-modified propylene polymer onto which maleic anhydride had been grafted was separated and purified from (poly)maleic anhydride and low-molecular-weight materials. Thereafter, drying was performed at 50° C. for 5 hours under reduced pressure, thus obtaining a maleic-anhydride-modified propylene polymer (MPO-1, acid value: 4 mgKOH/g-resin, weight average molecular weight: 29,000).

Production Example 2

One hundred parts by mass of a propylene-butene copolymer (Tafmer (registered trademark) XM7070, produced by Mitsui Chemicals, Inc., propylene/1-butene=75/25 (molar ratio)), 150 parts by mass of toluene, 2 parts by mass of maleic anhydride, and 0.5 parts by mass of tert-butyl peroxyisopropyl monocarbonate were placed in a 1-L autoclave. The mixture was heated to 120° C. and then stirred for another 1 hour. Thereafter, a maleic-anhydride-modified propylene-butene copolymer (MPO-2, acid value: 4 mgKOH/g-resin, weight average molecular weight: 109,000) was obtained in the same manner as in Production Example 1.

Production Example 3

A maleic-anhydride-modified propylene polymer (MPO-3, acid value: 25 mgKOH/g-resin, weight average molecular weight: 26,000) was obtained in the same manner as in Production Example 1 except that the amount of maleic anhydride was 20 parts by mass.

Production Example 4

A maleic-anhydride-modified propylene-butene copolymer (MPO-4, acid value: 25 mgKOH/g-resin, weight average molecular weight: 116,000) was obtained in the same manner as in Production Example 2 except that the amount of maleic anhydride was 20 parts by mass, and the amount of tert-butyl peroxyisopropyl monocarbonate was 2 parts by mass.

Production Example 5

One hundred parts by mass of a propylene-butene copolymer (Tafmer (registered trademark) XM7070, produced by Mitsui Chemicals, Inc.), 150 parts by mass of toluene, and 18 parts by mass of maleic anhydride, and 6 parts by mass of di-tert-butyl peroxide were placed in a 1-L autoclave. The mixture was heated to 160° C. and then stirred for another 3 hours. Thereafter, a maleic-anhydride-modified propylene-butene copolymer (MPO-5, acid value: 17 mgKOH/g-resin, weight average molecular weight: 58,000) was obtained in the same manner as in Production Example 1.

Production Example 6

One hundred parts by mass of a propylene-butene copolymer (Tafmer (registered trademark) XM7070, produced by Mitsui Chemicals, Inc.), 150 parts by mass of toluene, 7 parts by mass of maleic anhydride, and 6 parts by mass of tert-butyl peroxyisopropyl monocarbonate were placed in a 1-L autoclave. The mixture was heated to 140° C. and then stirred for another 3 hours. Thereafter, a maleic-anhydride-modified propylene-butene copolymer (MPO-6, acid value: 7 mgKOH/g-resin, weight average molecular weight: 84,000) was obtained in the same manner as in Production Example 1.

Production Example 7

One hundred parts by mass of a propylene-butene copolymer (Tafmer (registered trademark) XM7070, produced by Mitsui Chemicals, Inc.), 150 parts by mass of toluene, 7 parts by mass of maleic anhydride, and 6 parts by mass of di-tert-butyl peroxide were placed in a 1-L autoclave. The mixture was heated to 160° C. and then stirred for another 3 hours. Thereafter, a maleic-anhydride-modified propylene-butene copolymer (MPO-7, acid value: 19 mgKOH/g-resin, weight average molecular weight: 44,000) was obtained in the same manner as in Production Example 1.

Production Example 8

A maleic-anhydride-modified propylene-butene copolymer (MPO-8, acid value: 26 mgKOH/g-resin, weight average molecular weight: 40,000) was obtained in the same manner as in Production Example 5 except that the amount of maleic anhydride was 25 parts by mass, and the amount of di-tert-butyl peroxide was 10 parts by mass.

Production Example 9

One hundred parts by mass of a propylene butene copolymer (Tafmer (registered trademark) XM7080, produced by Mitsui Chemicals, Inc., propylene/1-butene=80/20 (molar ratio)), 150 parts by mass of toluene, 1 part by mass of maleic anhydride, and 0.5 parts by mass of tert-butyl peroxyisopropyl monocarbonate were placed in a 1-L autoclave. The mixture was heated to 140° C. and then stirred for another 3 hours. Thereafter, a maleic-anhydride-modified propylene polymer (MPO-9, acid value: 2 mgKOH/g-resin, weight average molecular weight: 170,000) was obtained in the same manner as in Production Example 1.

Production Example 10

One hundred parts by mass of a propylene polymer (L-Modu (registered trademark) 5600, produced by Idemitsu Kosan Co., Ltd.), 150 parts by mass of toluene, 12 parts by mass of glycidyl methacrylate, and 4 parts by mass of di-tert-butyl peroxide were placed in a 1-L autoclave. The mixture was heated to 140° C. and then stirred for another 3 hours. Thereafter, a glycidyl-methacrylate-modified propylene polymer (GPO-1, epoxy equivalent: 8,800 g/eq., weight average molecular weight: 66,000) was obtained in the same manner as in Production Example 1.

Production Example 11

One hundred parts by mass of the maleic-anhydride-modified propylene polymer (MPO-1) obtained in Production Example 1, and 15 parts by mass of polyetheramine (JEFFAMINE (registered trademark) M-2000, produced by Huntsman Corp.) were placed in a 500-ml four-necked flask equipped with a water-cooled reflux condenser and a stirrer. The mixture was heated to 110° C. with stirring, and stirring was continued for 3 hours, followed by cooling to thus obtain a polyether-modified propylene polymer (PO-1, grafted amount: 6.1 mass %, weight average molecular weight: 30,000, melting point: 50° C.)

Production Example 12

A polyether-modified propylene-butene copolymer (PO-2, grafted amount: 6.0 mass %, weight average molecular weight: 110,000, melting point: 68° C.) was obtained in the same manner as in Production Example 11 except that the maleic-anhydride-modified propylene polymer (MPO-1) was changed to the maleic-anhydride-modified propylene-butene copolymer (MPO-2).

Production Example 13

A polyether-modified propylene polymer (PO-3, grafted amount: 37.1 mass %, weight average molecular weight: 30,000, melting point: 45° C.) was obtained in the same manner as in Production Example 11 except that the maleic-anhydride-modified propylene polymer (MPO-1) was changed to the maleic-anhydride-modified propylene polymer (MPO-3) and the amount of polyetheramine (JEFFAMINE (registered trademark) M-2000, produced by Huntsman Corp.) was changed to 93 parts by mass.

Production Example 14

A Polyether-modified propylene-butene copolymer (PO-4, grafted amount: 37.0 mass %, weight average molecular weight: 120,000, melting point: 60° C.) was obtained in the same manner as in Production Example 13 except that the maleic-anhydride-modified propylene polymer (MPO-3) was changed to the maleic-anhydride-modified propylene-butene copolymer (MPO-4).

Production Example 15

A polyether-modified propylene-butene copolymer (PO-5, grafted amount: 22.9 mass %, weight average molecular weight: 61,000, melting point: 55° C.) was obtained in the same manner as in Production Example 11 except that the maleic-anhydride-modified propylene polymer (MPO-1) was changed to the maleic-anhydride-modified propylene-butene copolymer (MPO-5), and the amount of polyetheramine (JEFFAMINE (registered trademark) M-2000, produced by Huntsman Corp.) was changed to 63 parts by mass.

Production Example 16

A polyether-modified propylene-butene copolymer (PO-6, grafted amount: 10.9 mass %, weight average molecular weight: 85,000, melting point: 65° C.) was obtained in the same manner as in Production Example 11 except that the maleic-anhydride-modified propylene polymer (MPO-1) was changed to the maleic-anhydride-modified propylene-butene copolymer (MPO-6), and the amount of polyetheramine (JEFFAMINE (registered trademark) M-2000, produced by Huntsman Corp.) was changed to 27 parts by mass.

Production Example 17

A polyether-modified propylene-butene copolymer (PO-7, grafted amount: 28.4 mass %, weight average molecular weight: 47,000, melting point: 47° C.) was obtained in the same manner as in Production Example 11 except that the maleic-anhydride-modified propylene polymer (MPO-1) was changed to the maleic-anhydride-modified propylene-butene copolymer (MPO-7), and the amount of polyetheramine (JEFFAMINE (registered trademark) M-2000, produced by Huntsman Corp.) was changed to 72 parts by mass.

Production Example 18

A polyether-modified propylene-butene copolymer (PO-8, grafted amount: 12.9 mass %, weight average molecular weight: 41,000, melting point: 35° C.) was obtained in the same manner as in Production Example 11 except that the maleic-anhydride-modified propylene polymer (MPO-1) was changed to the maleic-anhydride-modified propylene-butene copolymer (MPO-8), and 15 parts by mass of the polyetheramine (JEFFAMINE (registered trademark) M-2000, produced by Huntsman Corp.) was changed to 29 parts by mass of polyetheramine (JEFFAMINE (registered trademark) M-600, produced by Huntsman Corp.).

Production Example 19

A polyether-modified propylene-butene copolymer (PO-9, grafted amount: 26.9 mass %, weight average molecular weight: 60,000, melting point: 55° C.) was obtained in the same manner as in Production Example 11 except that the maleic-anhydride-modified propylene polymer (MPO-1) was changed to the maleic-anhydride-modified propylene-butene copolymer (MPO-5) and 15 parts by mass of the polyetheramine (JEFFAMINE (registered trademark) M-2000, produced by Huntsman Corp.) was changed to 98 parts by mass of polypropylene glycol monobutyl ether (Unilube (registered trademark) MB-700, produced by NOF Corporation).

Production Example 20

An acrylic-modified propylene polymer (PO-10, grafted amount: 18.3 mass %, weight average molecular weight: 60,000, melting point: 56° C.) was obtained in the same manner as in Production Example 11 except that 15 parts by mass of the polyetheramine (JEFFAMINE (registered trademark) M-2000, produced by Huntsman Corp.) was changed to 48 parts by mass of a hydroxyl group-containing acrylic polymer (Actflow (registered trademark) UMB-1001, produced by Soken Chemical & Engineering Co., Ltd.).

Production Example 21

A polyether-modified propylene polymer (PO-11, grafted amount: 28.0 mass %, weight average molecular weight: 68,000, melting point: 58° C.) was obtained in the same manner as in Production Example 11 except that the maleic-anhydride-modified propylene polymer (MPO-1) was changed to glycidyl methacrylate-modified propylene polymer (GPO-1), and the amount of polyetheramine (JEFFAMINE (registered trademark) M-2000, produced by Huntsman Corp.) was changed to 47 parts by mass.

Production Example 22

A polyether-modified propylene polymer (PO-12, grafted amount: 4.1 mass %, weight average molecular weight: 172,000, melting point: 75° C.) was obtained in the same manner as in Production Example 11 except that the maleic-anhydride-modified propylene polymer (MPO-1) was changed to the maleic-anhydride-modified propylene-butene copolymer (MPO-9), and the amount of polyetheramine (JEFFAMINE (registered trademark) M-2000, produced by Huntsman Corp.) was changed to 10 parts by mass.

Preparation of Main Agent 1

Ninety-five parts by mass of a hydrolyzable-silyl-group-containing polyether resin A-1, and 5 parts by mass of the polyether-modified propylene polymer (PO-1) obtained in Production Example 11 were placed in a 500-ml four-necked flask equipped with a water-cooled reflux condenser and a stirrer. The mixture was heated to 110° C. with stirring, and stirring was continued for 1 hour, followed by cooling to 40° C. or lower, thus obtaining main agent 1.

Preparation of Main Agents 2 to 16

Main agents 2 to 16 were prepared in the same manner as in main agent 1 except that the moisture-curable resin and the modified polyolefin resin were changed as shown in Table 1, and that, in main agent 12, polypropylene glycol #700 diacrylate was added as the radical polymerizable monomer simultaneously with the moisture-curable resin and the modified polyolefin resin. The amounts added are shown in Table 1.

TABLE 1

|  |  | Main agent 1 | Main agent 2 | Main agent 3 | Main agent 4 | Main agent 5 | Main agent 6 | Main agent 7 | Main agent 8 | Main agent 9 | Main agent 10 |
|---|---|---|---|---|---|---|---|---|---|---|---|
| Moisture-curable resin (A) (parts by mass) | Hydrolyzable-silyl-group-containing polyether resin A-1*) | 95 | 97 | 65 | 92 | 80 | 88 | 80 | 90 | 80 |  |
|  | Hydrolyzable-silyl-group-containing acrylic polymer A-2**) |  |  |  |  |  |  |  |  |  | 85 |
| Modified polyolefin (B) (parts by mass) | PO-1 (grafted amount. 6.1 mass %, Mw = 30,000, Tm = 50° C.) | 5 |  |  |  |  |  |  |  |  |  |
|  | PO-2 (grafted amount 6.0 mass %, Mw = 110,000, Tm = 68° C.) |  | 3 |  |  |  |  |  |  |  |  |
|  | PO-3 (grafted amount 37.1 mass %, Mw = 30,000, Tm = 45° C.) |  |  | 35 |  |  |  |  |  |  |  |
|  | PO-4 (grafted amount 37.0 mass %, Mw = 120,000, Tm = 60° C.) |  |  |  | 8 |  |  |  |  |  |  |
|  | PO-5 (grafted amount 22.9 mass %, Mw = 61,000, Tm = 55° C.) |  |  |  |  | 20 |  |  |  |  |  |
|  | PO-6 (grafted amount 10.9 mass %, Mw = 85,000, Tm = 65° C.) |  |  |  |  |  | 12 |  |  |  |  |
|  | PO-7 (grafted amount 28.4 mass %, Mw = 47,000, Tm = 47° C.) |  |  |  |  |  |  | 20 |  |  |  |
|  | PO-8 (grafted amount 12.9 mass %, Mw = 41,000, Tm = 35° C.) |  |  |  |  |  |  |  | 10 |  |  |
|  | PO-9 (grafted amount 26.9 mass %, Mw = 60,000, Tm = 55° C.) |  |  |  |  |  |  |  |  | 20 |  |
|  | PO-10 (grafted amount 18.3 mass %, Mw = 60,000, Tm = 56° C.) |  |  |  |  |  |  |  |  |  | 15 |
|  | PO-11 (grafted amount 28.0 mass %, Mw = 68,000, Tm = 58° C.) |  |  |  |  |  |  |  |  |  |  |
|  | PO-12 (grafted amount 4.1 mass %, Mw = 172,000, Tm = 75° C. |  |  |  |  |  |  |  |  |  |  |
|  | MPO-5 (acid value: 17 mgKOH/g-resin, Mw = 58,000) |  |  |  |  |  |  |  |  |  |  |
| Radical polymerizable monomer (C) (parts by mass) | Polypropylene glycol diacrylate*** |  |  |  |  |  |  |  |  |  |  |

|  |  | Main agent 11 | Main agent 12 | Main agent 13 | Main agent 14 | Main agent 15 | Main agent 16 |
|---|---|---|---|---|---|---|---|
| Moisture-curable resin (A) (parts by mass) | Hydrolyzable-silyl-group-containing polyether resin A-1*) | 80 |  | 48 | 99 | 98 | 98 |
|  | Hydrolyzable-silyl-group-containing acrylic polymer A-2**) |  | 80 |  |  |  |  |
| Modified polyolefin (B) (parts by mass) | PO-1 (grafted amount. 6.1 mass %, Mw = 30,000, Tm = 50° C.) |  |  |  |  |  |  |
|  | PO-2 (grafted amount 6.0 mass %, Mw = 110,000, Tm = 68° C.) |  |  |  |  |  |  |
|  | PO-3 (grafted amount 37.1 mass %, Mw = 30,000, Tm = 45° C.) |  |  |  | 52 |  |  |
|  | PO-4 (grafted amount 37.0 mass %, Mw = 120,000, Tm = 60° C.) |  |  |  |  |  |  |

TABLE 1-continued

| | | | | |
|---|---|---|---|---|
| | PO-5 (grafted amount 22.9 mass %, Mw = 61,000, Tm = 55° C.) | | 20 | 1 |
| | PO-6 (grafted amount 10.9 mass %, Mw = 85,000, Tm = 65° C.) | | | |
| | PO-7 (grafted amount 28.4 mass %, Mw = 47,000, Tm = 47° C.) | | | |
| | PO-8 (grafted amount 12.9 mass %, Mw = 41,000, Tm = 35° C.) | | | |
| | PO-9 (grafted amount 26.9 mass %, Mw = 60,000, Tm = 55° C.) | | | |
| | PO-10 (grafted amount 18.3 mass %, Mw = 60,000, Tm = 56° C.) | | | |
| | PO-11 (grafted amount 28.0 mass %, Mw = 68,000, Tm = 58° C.) | 20 | | |
| | PO-12 (grafted amount 4.1 mass %, Mw = 172,000, Tm = 75° C. | | | 2 |
| | MPO-5 (acid value: 17 mgKOH/g-resin, Mw = 58,000) | | | 2 |
| Radical polymerizable monomer (C) (parts by mass) | Polypropylene glycol diacrylate*** | 40 | | |

*)A-1: number average molecular weight = 18,000, average number of hydrolyzable silyl groups = 1.4 (per molecule)
**)A-2: weight average molecular weight = 3,000, average number of hydrolyzable silyl groups = 1.0 (per molecule)
***Polypropylene glycol #700 diacrylate

Example 1

100 parts by mass of main agent 1 obtained as described above and 1 part by mass of dibutyl tin dilaurate as a silanol condensation catalyst were blended to obtain an adhesive composition. Table 2 shows the test results of the liquid state and adhesion.

Examples 2 to 15 and Comparative Examples 1 to 3

Examples 2 to 15 and Comparative Examples 1 to 3 were performed in the same manner as in Example 1 except that main agents 1 to 16 and the dibutyltin dilaurate were changed as shown in Tables 2 and 3, and that, in Example 12, 1-hydroxycyclohexyl phenyl ketone, which is a radical polymerization initiator, was added simultaneously with the main agent and the silanol condensation catalyst. Tables 2 and 3 show the amounts used and the test results of the liquid state and adhesion. Since Comparative Example 3 showed poor liquid state and the occurrence of gelation, evaluation as an adhesive could not be conducted.

TABLE 2

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| Main agent 1 (parts by mass) | 100 | | | | | | | | | | | | | | |
| Main agent 2 (parts by mass) | | 100 | | | | | | | | | | | | | |
| Main agent 3 (parts by mass) | | | 100 | | | | | | | | | | | | |
| Main agent 4 (parts by mass) | | | | 100 | | | | | | | | | | | |
| Main agent 5 (parts by mass) | | | | | 100 | | | | | | | | | | |
| Main agent 6 (parts by mass) | | | | | | 100 | | | | | | | | | |
| Main agent 7 (parts by mass) | | | | | | | 100 | | | | | | | | |
| Main agent 8 (parts by mass) | | | | | | | | 100 | | | | | | | |
| Main aqent 9 (parts by mass) | | | | | | | | | 100 | | | | | | |
| Main agent 10 (parts by mass) | | | | | | | | | | 100 | | | | | |
| Main agent 11 (parts by mass) | | | | | | | | | | | 100 | | | | |
| Main agent 12 (parts by mass) | | | | | | | | | | | | 140 | | | |
| Main agent 13 (parts by mass) | | | | | | | | | | | | | 100 | | |

TABLE 2-continued

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|---|
| Main agent 15 (parts by mass) | | | | | | | | | | | | | | 100 | | |
| Main agent 16 (parts by mass) | | | | | | | | | | | | | | | | 100 |
| Radical polymerization initiator (D) (parts by mass) | 1-Hydroxy-cyclohexyl phenyl ketone | | | | | | | | | | | | 0.4 | | | |
| Silanol condensation catalyst (E) (parts by mass) | Dibutyltin dilaurate | 1 | 1 | 1 | 1 | 1 | 1 | 1 | 1 | 1 | 1 | 1 | 1 | 1 | 1 | 1 |
| Liquid state | Solution viscosity at 25° C. (Pa·s) | 10 | 13 | 24 | 22 | 13 | 12 | 11 | 9 | 13 | 12 | 11 | 12 | 28 | 29 | 28 |
| | Evaluation | A | A | B | B | A | A | A | A | A | A | A | A | B | B | B |
| Adhesion | Adhesion shear strength (MPa) | 0.3 | 0.3 | 1.0 | 0.5 | 1.3 | 1.1 | 1.0 | 0.6 | 1.0 | 0.7 | 0.8 | 1.1 | 0.2 | 0.2 | 0.2 |
| | Evaluation | B | B | A | B | A | A | A | A | A | A | A | A | B | B | B |

TABLE 3

| | | Comp. Ex. 1 | Comp. Ex. 2 | Comp. Ex. 3 |
|---|---|---|---|---|
| Moisture-curable resin (A) (parts by mass) | (A-1) Hydrolyzable-silyl-group-containing polyether resin | 100 | | |
| | Main agent 14 | | 100 | 100 |
| Silanol condensation catalyst (E) (parts by mass) | Dibutyltin dilaurate | 1 | 1 | |
| Liquid state | Solution viscosity at 25° C. (Pa·s) | 8 | 9 | 13 |
| | Evaluation | A | A | A |
| Adhesion | Adhesion shear strength (MPa) | 0.1> | 0.1> | 0.1> |
| | Evaluation | C | C | C |

Materials Used

The materials used in Table 1, Table 2, and Table 3 are as follows.

Moisture-Curable Resin (A)

A-1: a hydrolyzable-silyl-group-containing polyether resin with a number average molecular weight of 18,000, a viscosity at 25° C. of 12,000 mPa·s, and an average number of hydrolyzable silyl groups per molecule of 1.4

A-2: a hydrolyzable-silyl-group-containing acrylic polymer with a number average molecular weight of 9,000, a viscosity at 25° C. of 7,000 mPa·s, and an average number of hydrolyzable silyl groups per molecule of 1.0

Radical Polymerizable Monomer (C)

Polypropylene glycol diacrylate: polypropylene glycol #700 diacrylate (produced by Shin Nakamura Chemical Co Ltd., NK Ester (trademark registration) APG-700)

Radical Polymerization Initiator (D)

1-Hydroxycyclohexyl phenyl ketone: a reagent sold by Tokyo Chemical Industry Co., Ltd.

Silanol Condensation Catalyst (E)

Dibutyltin dilaurate: a reagent sold by Tokyo Chemical Industry Co., Ltd.

The acid-modified polyolefins, glycidyl-methacrylate-modified polyolefins, polyether-resin-modified polyolefins, (meth)acrylate polymer polyolefins, and adhesive compositions obtained as described above were subjected to analytical measurements and evaluations based on the following methods.

Measurement of Acid Value

The acid value (mgKOH/g-resin) in the present invention is determined using FT-IR (FT-IR8200PC, produced by Shimadzu Corporation). More specifically, the acid value (mgKOH/g-resin) in the present invention refers to a value calculated according to the following formula using a coefficient (f) obtained from the calibration curve prepared using a solution of maleic anhydride (produced by Tokyo Chemical Industry Co., Ltd.) in chloroform, and an absorbance (I) of the stretching peak (1780 $cm^{-1}$) of the carbonyl bond (C=O) in maleic anhydride in a crystalline-maleic-anhydride-modified polyolefin solution.

$$\text{Acid value (mgKOH/g-resin)} = [\text{absorbance } (I) \times (f) \times 2 \times \text{molecular weight of potassium hydroxide} \times 1000 \text{ (mg)}/\text{molecular weight of maleic anhydride}]$$

Molecular weight of maleic anhydride: 98.06

Molecular weight of potassium hydroxide: 56.11

Measurement of Epoxy Equivalent

The epoxy equivalent (g/eq.) in the present invention is determined using FT-IR (FT-IR8200PC, produced by Shimadzu Corporation). More specifically, the epoxy equivalent (g/eq.) in the present invention refers to a value calculated according to the following formula using a coefficient (f) obtained from the calibration curve prepared using a solution of glycidyl methacrylate (produced by Tokyo Chemical Industry Co., Ltd.) in chloroform, and an absorbance (I) of the stretching peak (1732 $cm^{-1}$) of the ester carbonyl bond (C=O) in glycidyl methacrylate in a glycidyl methacrylate-modified polyolefin solution.

$$\text{Epoxy equivalent (g/eq.)} = 100/\{[\text{absorbance } (I) \times (f)]/\text{molecular weight of glycidyl methacrylate}\}$$

Molecular weight of glycidyl methacrylate: 142.15

Measurement of Weight Average Molecular Weight (Mw)

The weight average molecular weight in the present invention is a value measured by an Alliance e2695 gel permeation chromatograph (referred to below as "GPC," standard substance: polystyrene resin, mobile phase: tetrahydrofuran) produced by Nihon Waters K. K.

Measurement of Melting Point

The melting point and heat of fusion in the present invention are values measured with a differential scanning calorimeter (referred to below as "DSC," Q-2000, produced by TA Instruments Japan Inc.) from the top temperature and area of the melting peak when a sample was melted by heating at a rate of 20° C./min, cooled to achieve resinification, and melted again by heating.

Measurement of Grafted Amount

The grafted amount in the present invention is determined as follows. Specifically, 100 g of a modified polyolefin resin was dissolved by heating in 250 g of toluene, the resulting mixture was then introduced into 1000 g of acetone, and the deposit was filtered and dried. The resulting purified product of the modified polyolefin resin was subjected to $^1$H-NMR (produced by Varian Inova, 400 MHz) measurement to determine the grafted amounts (wt %) of polyether resin and acrylic polymer.

Evaluation of Liquid State of Adhesive Composition

The liquid state of the adhesive compositions listed in Tables 1 and 2 was evaluated by measuring the solution viscosity at 25° C. at a rotational speed of 0.5 rpm using a rotor No. 0.8° with TVE-22H (E-type viscometer) produced by Toki Sangyo Co., Ltd.

Evaluation Criteria

A (excellent in practical use): less than 20 Pa·s
B (possible in practical use): 20 Pa·s or more and less than 30 Pa·s
C (impossible in practical use): 30 Pa·s or more, gelation occurred, and separation and sedimentation occurred Preparation of Adhesive Plate The following plates were used as substrates: a PP plate whose surface was purified with isopropyl alcohol, and an A1050P aluminum plate soaked for 5 minutes in an aqueous degreasing agent solution heated to 60° C. (4 wt % aqueous solution of fine cleaner FC315E, produced by Nihon Parkerizing Co., Ltd.) for degreasing treatment, washed with water, and wiped to remove water (both plates were produced by Nippon Testpanel Co., Ltd., length×width×thickness=100 mm×25 mm×2 mm).

Each of the adhesive compositions obtained in the Examples and the Comparative Examples, except for the adhesive composition obtained in Example 11, was applied to the PP plate with a wire bar coater No. 16. Then, the A1050P aluminum plate (25 mm×20 mm) was attached to and pressed on the resulting plate under the conditions of 25° C., 0.05 MPa, and 10 seconds using a TP-701-B heat seal tester, produced by Tester Sangyo Co., Ltd. The adhesive portion was fixed with a clip (produced by ASKUL Corporation, double clip, small, width: 19 mm), followed by aging for 168 hours at 25° C. in an atmosphere of 60% RH.

Further, the adhesive composition obtained in Example 12 was applied to the PP plate in the same manner as above with a wire bar coater No. 16, and UV light was irradiated for 5 seconds from a distance of 4 cm with a multilight ML-251A/B, produced by Ushio Inc. Then, the A1050P aluminum plate (25 mm×20 mm) was attached to and pressed on the resulting plate in the same manner as above under the conditions of 25° C., 0.05 MPa, and 10 seconds using a TP-701-B heat seal tester, produced by Tester Sangyo Co., Ltd. The adhesive portion was fixed with a clip (produced by ASKUL Corporation, double clip, small, width: 19 mm), followed by aging for 168 hours at 25° C. in an atmosphere of 60% RH.

Adhesion Test

After aging the adhesive plates for 168 hours, a tensile test was conducted at a tensile speed of 50 mm/min using a Tensilon RTM-100, produced by Orientec Corporation, in an atmosphere of 25° C. to evaluate the tensile shear strength.

Evaluation Criteria

A (excellent in practical use): 1.0 MPa or more
B (possible in practical use): 0.2 MPa or more and less than 1.0 MPa
C (impossible in practical use): Less than 0.2 MPa

INDUSTRIAL APPLICABILITY

The moisture-curable compositions and adhesives of the present invention are capable of achieving adhesive strength sufficient for practical use with respect to difficult-to-adhere materials, such as polyolefin materials. In addition, the moisture-curable compositions and adhesives of the present invention show excellent adhesion to a wide variety of materials such as metals, glass, coated surfaces, etc. Thus, the moisture-curable compositions and adhesives of the present invention can be practically used as adhesives, joint materials, sealing materials, waterproof materials, paints, coating materials, lining materials, sealing materials, adhesive tapes, adhesive sheets, pressure-sensitive adhesives, adhesive processed products, and the like, and are extremely useful in the industry.

The invention claimed is:

1. An adhesive resin composition comprising a moisture-curable resin (A) and a modified polyolefin resin (B), wherein the content of the modified polyolefin resin (B) is 2 parts by mass or more and 100 parts by mass or less, per 100 parts by mass of the moisture-curable resin (A),
wherein the moisture-curable resin (A) is a resin containing a hydrolyzable silyl group at an end and having a main chain comprising a polyether or (meth)acrylate,
wherein the modified polyolefin resin (B) has a polyether structure or a (meth)acrylate polymer structure, and
wherein the modified polyolefin resin (B) is a polyolefin resin having a structure similar to that of the main skeleton of the moisture-curable resin (A).

2. The adhesive resin composition according to claim 1, wherein the modified polyolefin resin (B) is a resin having an amide bond and/or ester bond.

3. The adhesive resin composition according to claim 1, wherein the content of the polyether resin or (meth)acrylate polymer in the modified polyolefin resin (B) is 2 to 40 mass %.

4. The adhesive resin composition according to claim 1, wherein the content of the polyether resin or (meth)acrylate polymer in the modified polyolefin resin (B) is 2 to 40 mass %.

5. The adhesive resin composition according to claim 1, wherein the modified polyolefin resin (B) has a weight average molecular weight of 10,000 to 150,000.

6. The adhesive resin composition according to claim 1, further comprising a radical polymerizable monomer (C).

7. The adhesive resin composition according to claim 6, wherein the radical polymerizable monomer (C) is a compound containing a (meth)acryloyl group at an end.

8. The adhesive resin composition according to claim 1, further comprising a radical polymerization initiator (D).

9. The adhesive resin composition according to claim 1, further comprising a silanol condensation catalyst (E).

10. The adhesive resin composition according to claim 1, wherein the moisture-curable resin (A) is a resin having an olefin component content of 50 mass % or less.

* * * * *